US011260402B2

(12) United States Patent
Sommen (10) Patent No.: US 11,260,402 B2
(45) Date of Patent: Mar. 1, 2022

(54) ELECTROSTATIC SEPARATION DEVICE, AND ASSOCIATED SEPARATION METHOD AND USE

(71) Applicant: Skytech, Bonnieres-sur-Seine (FR)

(72) Inventor: Pierre Frédéric Claude Sommen, Pacy-sur-Eure (FR)

(73) Assignee: Skytech, Bonnieres-sur-Seine (FR)

( * ) Notice: Subject to any disclaimer, the term of this patent is extended or adjusted under 35 U.S.C. 154(b) by 0 days.

(21) Appl. No.: 16/996,808

(22) Filed: Aug. 18, 2020

(65) Prior Publication Data

US 2021/0053074 A1 Feb. 25, 2021

(30) Foreign Application Priority Data

Aug. 19, 2019 (FR) ...................................... 19 09271

(51) Int. Cl.
*B03C 7/12* (2006.01)
*B03C 7/00* (2006.01)

(52) U.S. Cl.
CPC ................ *B03C 7/12* (2013.01); *B03C 7/003* (2013.01)

(58) Field of Classification Search
CPC .......... B03C 7/12; B03C 7/003; B03C 7/006; B29B 17/02
See application file for complete search history.

(56) References Cited

U.S. PATENT DOCUMENTS

| | | | | |
|---|---|---|---|---|
| 2,706,044 A | * | 4/1955 | Cook, Jr. ................... | B03C 7/12 209/127.4 |
| 3,009,573 A | * | 11/1961 | Whipple ................... | B03C 7/12 209/130 |
| 3,493,109 A | * | 2/1970 | Mario ....................... | B03C 7/12 209/11 |
| 4,797,201 A | * | 1/1989 | Kuppers .................. | B03C 7/006 209/127.4 |
| 5,687,852 A | * | 11/1997 | Raschka ................. | B29B 17/02 209/127.4 |
| 6,011,229 A | * | 1/2000 | Geisler ..................... | B03C 7/12 209/127.4 |
| 6,681,938 B1 | | 1/2004 | Link et al. | |
| 2016/0038950 A1 | | 2/2016 | Park et al. | |

FOREIGN PATENT DOCUMENTS

| | | | | |
|---|---|---|---|---|
| IT | RE20110106 A1 | * | 5/2013 | ............ B03C 7/023 |
| IT | RE20110106 A1 | | 5/2013 | |
| JP | 2002/204980 A | | 7/2002 | |
| JP | 2003/311183 A | | 11/2003 | |

OTHER PUBLICATIONS

French Search Report for French Application No. FR19 09271, dated Apr. 30, 2020 in 2 pages.

* cited by examiner

*Primary Examiner* — Patrick H Mackey
(74) *Attorney, Agent, or Firm* — Knobbe, Martens, Olson & Bear, LLP (57) ABSTRACT

An electrostatic separation device (is for a mixture of granules of different materials. The device includes a separation chamber having an inlet and delimiting an inner volume and a collection device for granules placed in the inner volume, opposite the inlet. At least two pairs of electrodes are successively placed in the elevation direction in the inner volume, between the inlet and the collection device. Each pair includes an anode and a cathode, placed on either side of a central axis extending in the elevation direction. At least one generating system is suitable for applying a difference in electric potential between the anode and the cathode of each pair.

14 Claims, 4 Drawing Sheets

ELECTROSTATIC SEPARATION DEVICE, AND ASSOCIATED SEPARATION METHOD AND USE

FIELD OF THE INVENTION

The present invention relates to an electrostatic separation device for a mixture of granules of different materials. The invention also relates to a separation method implementing the preceding device, as well as a use of the device for a separation.

BACKGROUND OF THE INVENTION

Electrostatic separation devices are already used to sort mixed granular materials, for example coming from the shredding of industrial waste. Generally, the majority of the materials to be separated consists of electrically insulating materials, and in particular plastic materials.

For example, the recycling of electrical and/or electronic waste involves separating the various components before leveraging the obtained materials. It is desirable for such a separation to be as efficient as possible in order to obtain a substantially constant quality of the recycled materials.

When the materials to be separated have equal or very close densities, separation methods based on gravity are too imprecise and do not make it possible to obtain satisfactory separations.

To that end, techniques are known consisting of shredding the insulating materials to turn them into granules and separate them by electrostatic effect.

In a first step, the granules are charged by triboelectric effect in a vibrating or rotary device. In a second step, the charged granules are conveyed toward an electrostatic sorting device, in which they are separated by an electric field. To that end, the granules are injected from above the sorting device, where they fall between two electrodes.

The positively charged granules are attracted by the anode (the negative electrode), while the negatively charged granules are attracted by the cathode (the positive electrode). The granules thus deflected into their chute are separated and fall in a collection zone comprising different collectors, arranged at the bottom of the device and in line with the electrodes.

In the collection zone, the number of compartments varies so as to optimize the desired purity. The purest material is found in the compartments located at the ends of the collection zone, which receive the most greatly deflected granules, and the most mixed material is found in the most central compartments.

It is common to observe in the current separators that the rate of unseparated material is inclusively between 35% and 50%, that is to say that only 50% to 65% of material is separated in a single pass with a required purity level for example of 95%.

To address such a drawback, it is known to multiply the passages of the unseparated material in the separator, with the aim of artificially reducing the rate of unseparated material at the end of the chain.

This is not, however, fully satisfactory and produces a significant impact on the rate of output of material to be separated and increases the separation time and costs relative to a single pass.

To improve the separation rate of separation devices in a single pass, it is known to significantly increase the height of the separation zone, or to install several separation zones one after the other.

However, the space requirement of the devices is then greatly increased.

SUMMARY OF THE INVENTION

There is therefore a need for an electrostatic separation device for a mixture of granules of different materials making it possible to obtain an improved separation without a significant increase in the space requirement of the device or the time necessary for the separation.

To that end, the invention relates to an electrostatic separation device for a mixture of granules of different materials, the device comprising:
- a separation chamber having an inlet and delimiting an inner volume,
- a collection device for granules placed in the inner volume, opposite the inlet in an elevation direction,
- at least two pairs of electrodes successively placed in the elevation direction in the inner volume, between the inlet and the collection device, each pair comprising an anode and a cathode, placed on either side of a central axis extending in the elevation direction, and
- at least one generating system, suitable for applying a difference in electric potential between the anode and the cathode of each pair.

According to specific embodiments, the separating device comprises one or more of the following features, considered alone or according to any technically possible combination:
- the anode and the cathode of each pair of electrodes are separated by a gap, the gaps increasing from the inlet of the chamber in the elevation direction, each gap being measured in a direction perpendicular to the elevation direction;
- the anodes of the pairs of electrodes are aligned in a same row, called first row, and the cathodes of the pairs of electrodes are aligned in a same row, called second row, the first row and the second row each forming an angle inclusively between 0° and 45° with the central axis;
- the device further comprises at least one insulating panel placed between at least one among the anodes and the cathodes of two successive pairs of electrodes, the device preferably comprising insulating panels placed between the anodes and the cathodes of each pair of successive electrodes;
- each anode and each cathode of each pair of electrodes is cylindrical, the cylindrical shape having a cylinder axis perpendicular to the central axis;
- the generating system is able to apply differences in potential between the anode and the cathode of each pair generating an electric field between the pairs of electrodes of constant amplitude along the central axis;
- the generating system is able to apply differences in potential between the anode and the of each pair of electrodes increasing from one pair of electrodes to the next, from the inlet toward the collection device.

The invention also relates to a method for electrostatic separation of a mixture of granules of different materials, the method implementing an electrostatic separation device, the device comprising:
- a separation chamber having an inlet and delimiting an inner volume,
- a collection device for granules placed in the inner volume, opposite the inlet in an elevation direction,
- at least two pairs of electrodes successively placed in the elevation direction in the inner volume, between the inlet and the collection device, each pair comprising an anode and a cathode, placed on either side of a central axis extending in the elevation direction, and at least one generating system, suitable for applying a difference in electric potential between the anode and the cathode of each pair of electrodes, the method comprising the following steps:

introducing the mixture of granules through the inlet of the chamber, generating a difference in electric potential between the anode and the cathode of each pair of electrodes, separating at least part of the granules, and collecting separated granules in the collection device.

According to one specific embodiment, the method according to the invention comprises the following feature:

the method comprises a prior step for charging at least some of the granules of the mixture by triboelectricity, a portion of the granules being positively charged and a portion of the granules being negatively charged, such that the granules are deflected between the pairs of electrodes toward the anodes if they are positively charged and toward the cathodes if they are negatively charged.

The invention further relates to a use of a device as described above for separating a mixture comprising granules of different materials, the device comprising:

a separation chamber having an inlet and delimiting an inner volume, a collection device for granules placed in the inner volume, opposite the inlet in an elevation direction, at least two pairs of electrodes successively placed in the elevation direction in the inner volume, between the inlet and the collection device, each pair comprising an anode and a cathode, placed on either side of a central axis extending in the elevation direction, and at least one generating system, suitable for applying a difference in electric potential between the anode and the cathode of each pair, the materials of the granules being chosen from the group consisting of polypropylene, polystyrene, polyamide, acrylonitrile butadiene styrene and polyethylene.

BRIEF DESCRIPTION OF THE DRAWINGS

The invention will be better understood upon reading the following description, provided solely as an example and done in reference to the appended drawings, in which.

DETAILED DESCRIPTION OF PREFERRED EMBODIMENTS

Figure 1:
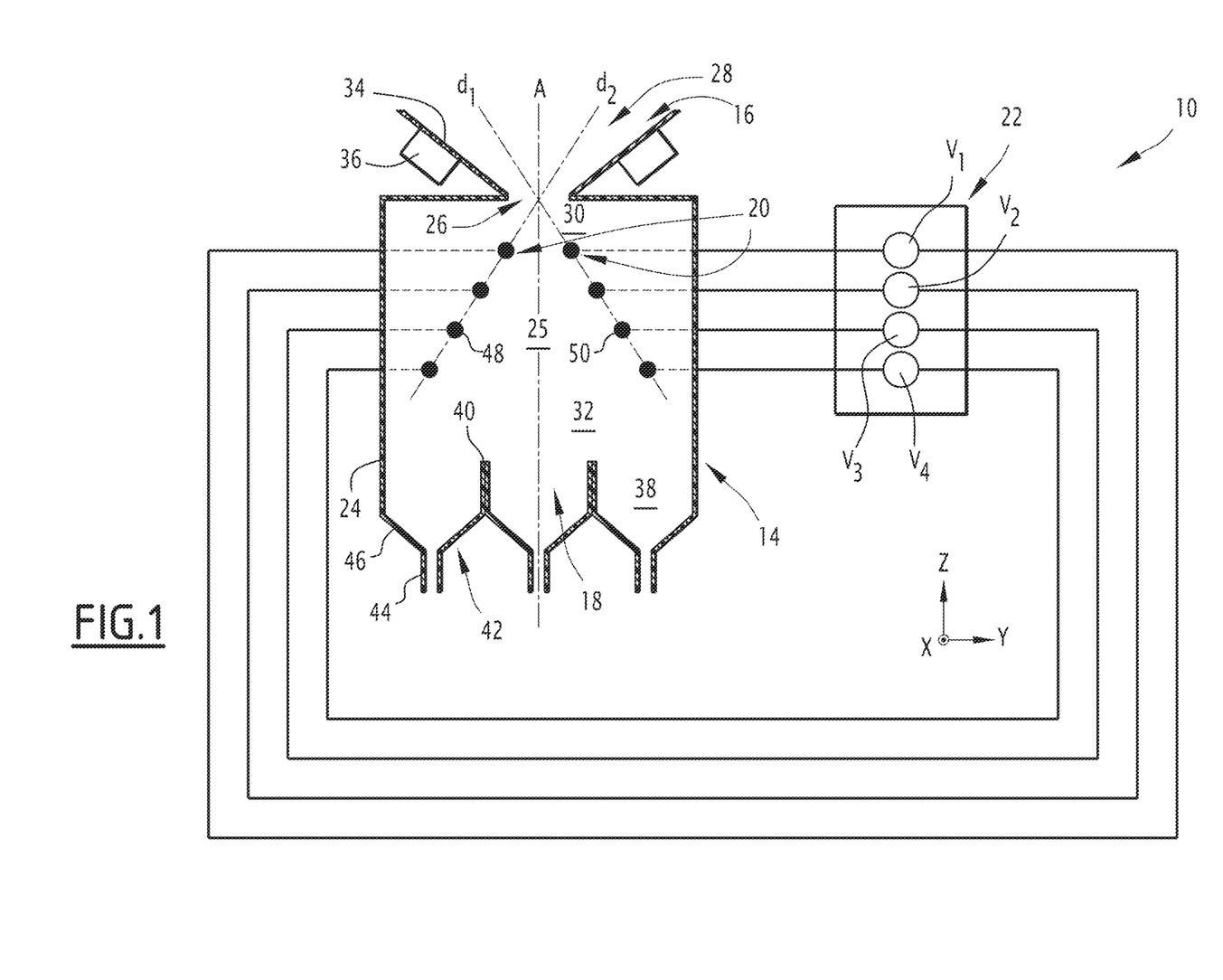
FIG. 1 is a schematic sectional view of an exemplary separation device.
Figure 2:
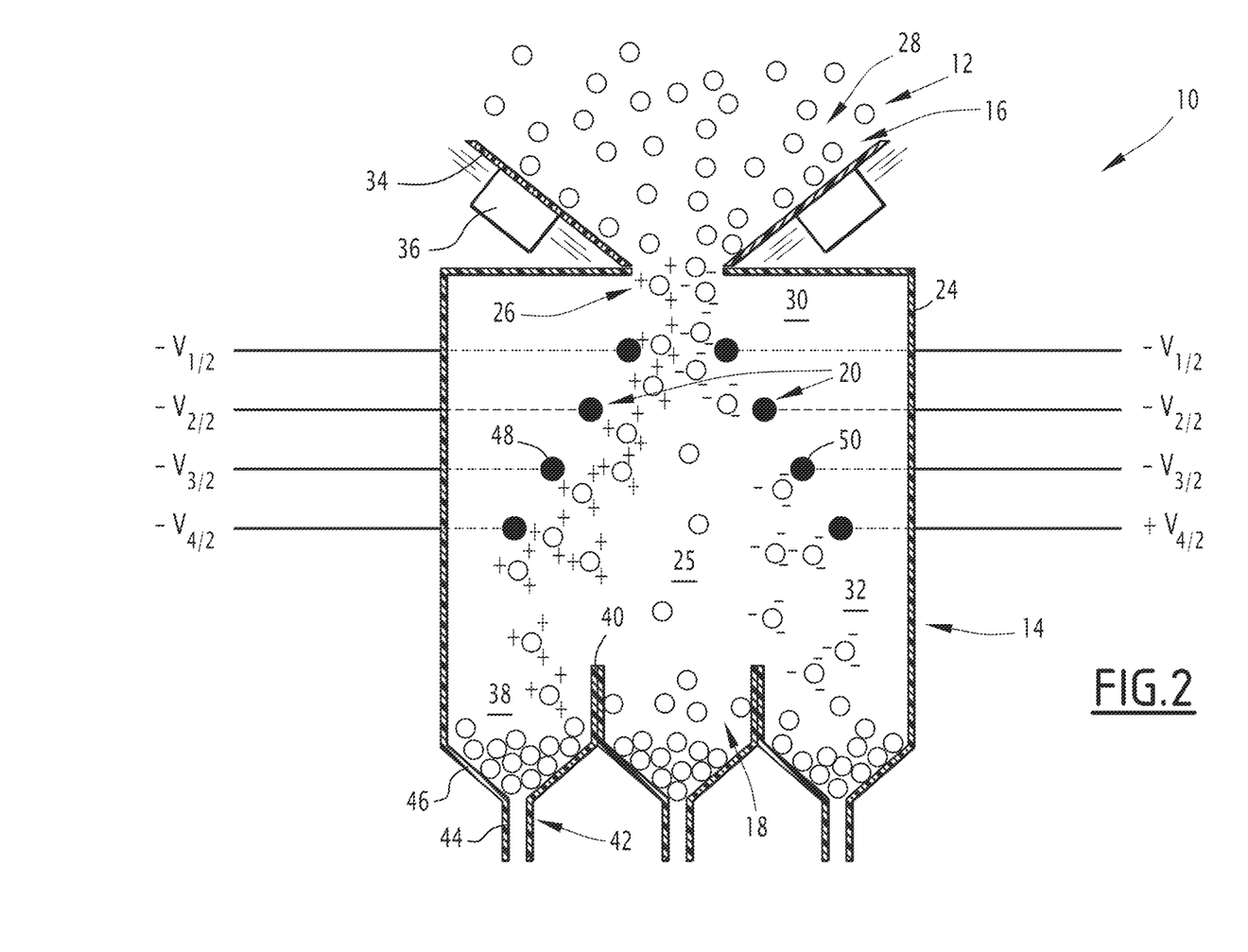
FIG. 2 is a schematic sectional view of the device of FIG. 1 during the implementation of a separation method.

A separation device 10 is shown in FIGS. 1 and 2. The device 10 is suitable for separating a mixture 12 of granules.

The device 10 is described in reference to an elevation direction Z, oriented according to gravity, as well as a longitudinal direction X and a transverse direction Y perpendicular to one another and to the elevation direction Z.

The device 10 comprises a separating chamber 14, a charging device 16 for charging the mixture 12, a collection device 18 for collecting the granules, at least two pairs 20 of electrodes and a system 22 for generating a difference in potential.

"Separating the mixture of granules" means that the device 10 is suitable for sorting at least part of the granules making up the mixture 12 based on a composition of said granules.

The mixture 12 of granules comprises granules of at least two different materials.

"Granule" refers to a particle having a substantially compact shape, made up of at least one material. A granule has millimetric characteristic dimensions. For example, each granule has lengths, measured along each of the directions, inclusively between 1 mm and 16 mm.

The mixture 12 in particular comprises granules of varied shapes and varied sizes, for example with a normal size distribution centered around the preceding characteristic dimensions.

"Granules of at least two different materials" means that the mixture 12 for example comprises at least a first population of granules primarily comprising a first material and a second population of granules primarily comprising a second material, the second material being different from the first material.

"Primarily" means that each granule of the first population for example comprises at least 90% by weight of the first material or that each granule of the second population comprises at least 90% by weight of the second material.

According to the proposed example, the first material and the second material are electrically insulating materials, in particular plastic materials.

For example, the first material and the second material are chosen from the group consisting of polypropylene, polystyrene, polyamide, acrylonitrile butadiene styrene and polyethylene.

The mixture 12 of granules is for example obtained by shredding, in particular waste, more specifically industrial waste, from electric and/or electronic equipment or from decommissioned vehicles.

The separating chamber 14 is a compartment suitable for containing and isolating the mixture 12 during the separation of the granules.

In particular, the separation chamber 14 is suitable for protecting the mixture 12 of granules from variations in temperature, pressure, humidity and electric field outside the chamber 14, during the separation.

The separation chamber 14 comprises walls 24 that delimit an inner volume 25 and define an inlet 26.

The chamber 14 comprises a device 28 for introducing granules through the inlet 26.

The separation chamber 14 contains the collection device 18 of the granules.

The separation chamber 14 extends along a central axis A, substantially parallel to the elevation direction Z, passing through the inlet 26 and the collection device 18 of the granules.

The chamber 14 comprises an upper part 30 and a lower part 32, relative to gravity.

The upper part 30 is for example the part of the chamber 14 extending above the pairs of electrodes 20, in the elevation direction Z.

The lower part 32 is for example the part of the chamber 14 extending below the pairs 20 of electrodes, in the elevation direction Z.

The inlet 26 is an opening in the walls 24 located in the upper part 30 of the chamber 14, relative to the elevation direction Z.

The inlet 26 is provided with the device 28 for introducing granules.

The introduction device 28 is suitable for introducing the granules into the separation chamber 14 through the inlet 26.

The introduction device 28 is, according to the example illustrated in FIGS. 1 and 2, a vibrating hopper, comprising hopper flanks 34 and at least one actuator 36.

The hopper flanks 34 define a frustoconical inner space, with axis parallel to the elevation direction Z, and converge toward the inlet 26 of the chamber 14.

The actuator(s) 36 are vibrating motors, arranged to vibrate the flanks 34, in order to facilitate the flow of the granules toward the inlet 26.

According to other embodiments, the device 28 for introducing the granules comprises a conveyor belt or a vibrating table.

The device 18 for collecting the granules is contained in the inner volume 25, and located in the lower part 32 of the chamber 14.

The device 18 for collecting the granules comprises a plurality of compartments 38 aligned along the lower part 32 of the chamber 14, in the transverse direction Y.

The device 18 for collecting the granules is suitable for receiving the granules after the granules have passed through the chamber 14.

The compartments 38 are substantially parallelepipedic spaces for receiving the granules, aligned along the transverse direction Y and separated from one another by flaps 40.

Each compartment 38 is arranged to receive a portion of the granules from the chamber 14.

The portion of the granules received by the compartment 38 depends on a deflection of the granules in the chamber 14 and a position of the compartment 38 in the lower part 32 of the chamber 14.

Advantageously, each compartment 38 comprises a discharge device 42 for the granules, suitable for continuously extracting the granules received by the compartment 38.

The discharge devices 42 allow the separation device 10 to operate continuously.

Each discharge device 42 for example comprises a pipe 44 emerging in the bottom of the compartment 38 by a flare 46, as well as a circulation member (not shown) for the granules in the pipe 44, for example a pump.

The charging device 16 is suitable for charging the granules of the mixture 12 before the introduction in the chamber 14, to allow the separation of the granules.

"Charging the granules" means that the charging device 16 is suitable for generating electric surface charges on an outer surface of at least part of the granules, owing to the triboelectricity phenomenon.

Triboelectricity is a phenomenon occurring during friction of surfaces of two different insulating materials, during which electron transfers occur from one of the surfaces toward the other, which causes the appearance of charges of surfaces of opposite signs on the two surfaces.

The charging device 16 is suitable for charging the granules by generating friction between the granules of different populations.

The charging device 16 is thus suitable for generating surface charges on the granules of the first population and surface charges of the opposite sign on the granules of the second population.

Advantageously, the charging device 16 comprises walls covered with an insulating material, the insulating material being suitable for generating surface charges by triboelectricity.

This is in particular possible when the materials making up the granules make it possible to choose an insulating material able to charge the granules with surface charges having different signs.

The charging device 16 is then also suitable for charging the granules by friction between the granules and the walls of the charging device 16.

In the embodiment shown in FIGS. 1 and 2, the charging device 16 is the device 28 for introducing granules, that is to say a vibrating hopper, the hopper flanks 34 constituting the walls of the charging device 16.

The actuators 36 are suitable for vibrating the flanks 34 of the hopper, generating friction between the granules contained in the inner space of the hopper, as well as between the granules and the flanks 34 of the hopper.

According to a variant that is not shown, the charging device 16 and the introduction device 28 are separate.

For example, the charging device 16 is located directly in the chamber 14, and for example comprises a blower suitable for agitating the granules in the chamber 14 and causing friction that leads to the charging of the granules by triboelectricity.

According to one embodiment shown in FIGS. 1 and 2, the device 10 comprises exactly four pairs 20 of electrodes.

Figure 3:
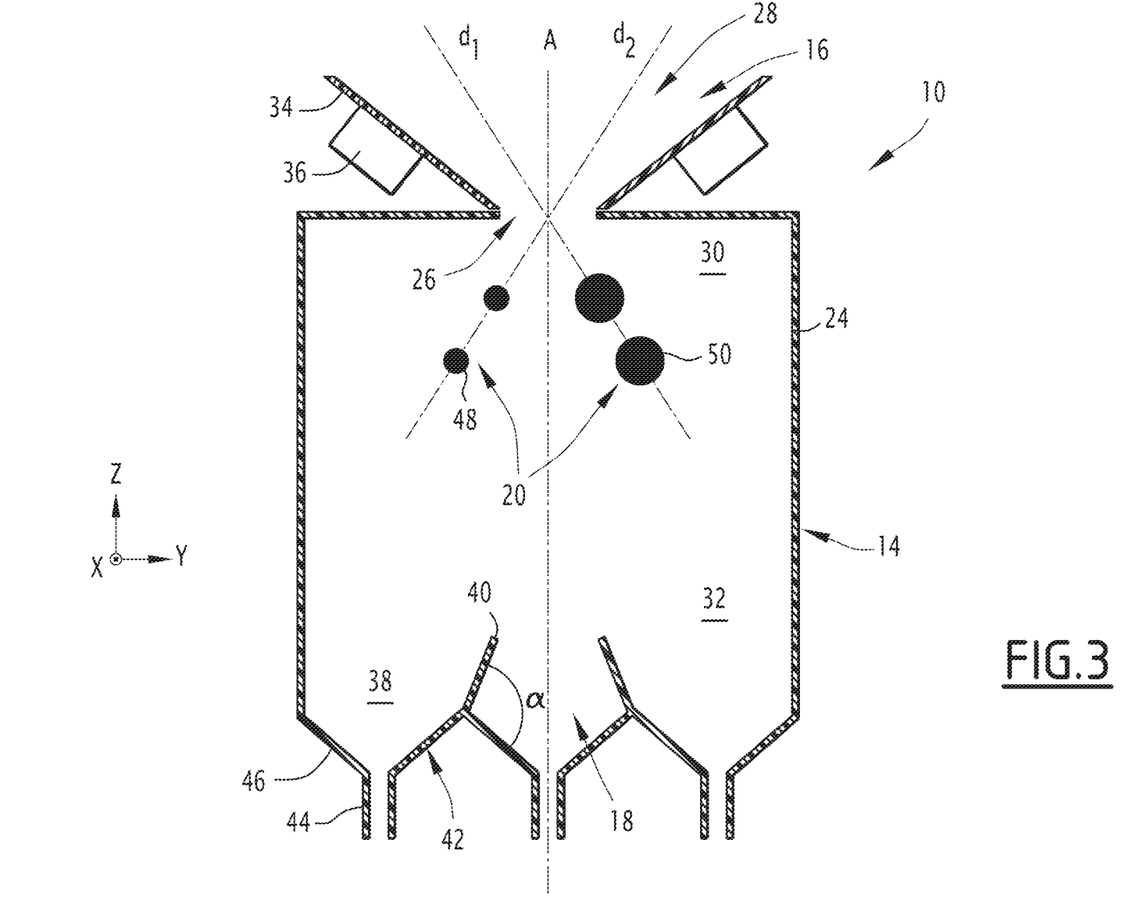
FIG. 3 is a schematic sectional view of another exemplary separation device.

According to another embodiment shown in FIG. 3, the device 10 comprises exactly two pairs 20 of electrodes.

The pairs 20 of electrodes are arranged in the inner volume 25 of the chamber 14, on either side of the central axis A, between the inlet 26 and the device 18 for collecting the granules.

The pairs 20 of electrodes are placed successively along the elevation direction Z, that is to say that the pairs 20 of electrodes are placed one after the other.

Each pair 20 of electrodes comprises an anode 48 and a cathode 50, placed on either side of the central axis A.

The anodes 48 of two successive pairs 20 are separated from one another by a first pitch, measured along the elevation direction Z.

The cathodes 50 of two successive pairs 30 are separated from one another by a second pitch, measured along the elevation direction Z.

The first pitch and the second pitch are equal, according to the example shown in FIGS. 1 and 2.

The pairs 20 of electrodes are suitable for generating an electric field at the central axis A.

The electric field generated by the pairs 20 of electrodes makes it possible to deflect the granules passing through the chamber 14.

Each anode 48 is an electrode suitable for receiving an electric potential imposed by the generating system 22.

The anodes 48 of the pairs 20 of electrodes are all placed on a same side of the central axis A.

Each cathode 50 is an electrode suitable for receiving an electric potential imposed by the generating system 22, the electric potential of the cathode 50 being greater than the electric potential of the corresponding anode 48 of the pair 20 of electrodes.

The cathodes 50 of the pairs 20 of electrodes are all placed on a same side of the central axis A, opposite the side of the anodes 48.

Each anode 48 and each cathode 50 have a cylindrical shape, according to the example shown in FIGS. 1 and 2.

The cylindrical shape has a central axis orthogonal to the elevation direction Z.

The cylindrical shape of the anodes 48 and the cathodes 50 is advantageous because it comprises few apices having acute angles, which greatly reduces the corona effect that accentuates the risk of discharge at these apices. Thus, the cylindrical shape makes it possible to apply potentials of greater amplitudes to the anodes 48 and cathodes 50 without exceeding the dielectric strength of the air.

Furthermore, the cylindrical shape makes it possible to better control the electric field locally relative to flat electrodes, since it allows a better localization of the electric potential, which increases the possibility of adjusting the distribution of the electric potentials in the chamber 14.

Lastly, according to one embodiment (not shown), the anodes 48 and the cathodes 50 are mounted rotating about their respective central axis, and comprise a respective cleaning brush for example located on the side opposite the central axis A. This allows continuous cleaning of the anodes 48 and cathodes 50 during the operation of the device 10, to prevent dirtying of the electrodes and a screening effect, which is made possible in particular by the cylindrical shape of the anodes 48 and the cathodes 50.

Advantageously, the axes of the anodes 48 and the axes of the cathodes 50 are all parallel to one another.

According to one embodiment, the axes of the anode 48 and of the cathode 50 of each pair 20 of electrodes for example extend at the same height in the chamber 14.

According to one embodiment, the axes of the anode 48 and of the cathode 50 of each pair 20 of electrodes extend symmetrically relative to the central axis A.

According to one embodiment shown in FIGS. 1 and 2, the anode 48 and the cathode 50 of each pair 20 of electrodes have the same dimensions.

According to one embodiment shown in FIG. 3, the anode 48 and the cathode 50 of each pair 20 of electrodes have different dimensions from one another, for example different diameters.

According to one embodiment, the anode 48 and the cathode 50 of each pair 20 of electrodes are brought to potentials of equal amplitudes and opposite signs.

According to another embodiment, the anode 48 and the cathode 50 are brought to potentials of different amplitudes and opposite signs.

The dimensions of the electrodes and the amplitudes of the electric potentials applied to the electrodes are determined so as to improve the separation of the granules.

Advantageously, the pairs 20 of electrodes are arranged in the chamber 14 divergently.

"Divergent" means that a gap, measured in the transverse direction Y, separating the anode 48 from the cathode 50 of each pair 20 of electrodes increases from the inlet 26 of the chamber 14 toward the device 18 for collecting the granules.

The divergent arrangement of the pairs 20 of electrodes makes it possible to increase the difference in potential between the anode 48 and the cathode 50 of the pairs 20 of electrodes close to the collection device 18, while keeping the amplitude of the electric field below the dielectric strength of the air in the chamber 14. This makes it possible to improve the separation of the granules near the lower part 32 of the chamber 14.

According to one embodiment shown in FIGS. 1 and 2, the axes of the cathodes 50 are aligned on a same line, called first line $d_1$, in a plane orthogonal to the axes of the cathodes 50.

According to one embodiment shown in FIGS. 1 and 2, the axes of the anodes 48 are aligned on a same line, called second line $d_2$, in a plane orthogonal to the axes of the anodes 48.

The first line $d_1$ and the second line $d_2$ respectively form a first angle $\alpha_1$ and a second angle $\alpha_2$ with the central axis A.

The first angle $\alpha_1$ and the second angle $\alpha_2$ are for example inclusively between 0° and 45°.

According to one embodiment, the first angle $\alpha_1$ and the second angle $\alpha_2$ are equal.

Figure 4:
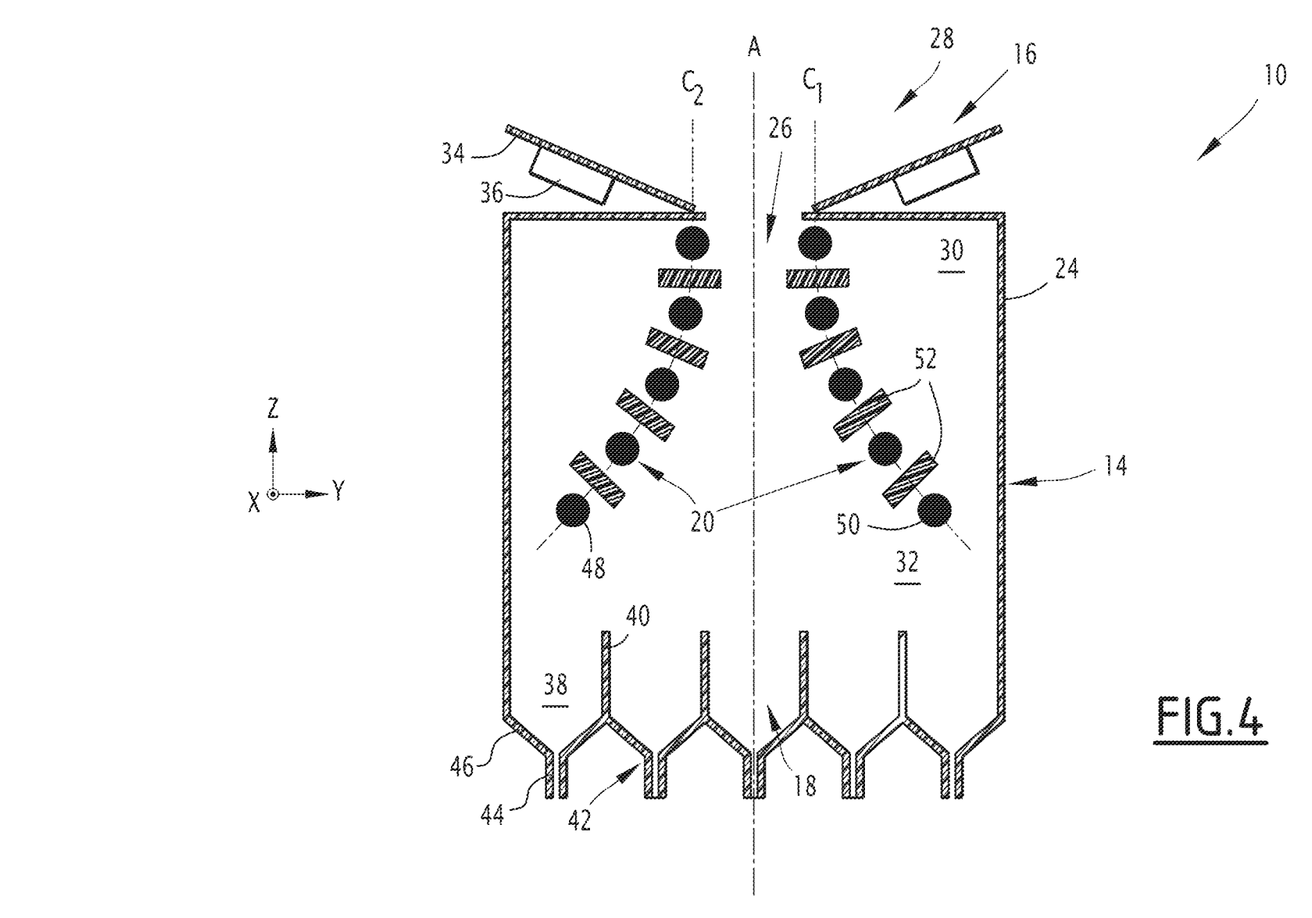
FIG. 4 is a schematic sectional view of still another exemplary separation device.

According to one embodiment shown in FIG. 4, the axes of the cathodes 50 are placed along a first curve $C_1$, for example a parabolic curve or a hyperbolic curve, in a plane orthogonal to the axes of the cathodes 50.

According to one embodiment shown in FIG. 4, the axes of the anodes 48 are placed along a second curve $C_2$, for example a parabolic curve or a hyperbolic curve, in a plane orthogonal to the axes of the anodes 48.

The generating system 22 is suitable for generating a difference in electric potential between the anode 48 and the cathode 50 of each pair 20 of electrodes, so as to form an electric field in the chamber 14 deflecting differences in potential.

The formed electric field has a sufficient intensity to deflect the granules having a surface charge and to direct them toward different compartments 38 of the collection device 18, to implement the separation.

Thus, the generating system 22 is suitable for deflecting the granules having a positive surface charge toward the anodes 48 and the granules having a negative surface charge toward the cathodes 50, as shown in FIG. 2.

According to one embodiment, the differences in potential applied between the anode 48 and the cathode 50 of each pair 20 of electrodes by the generating system 22 increase from one pair 20 of electrodes to the next, from the inlet 26 toward the collection device 18.

According to one embodiment, the electric potentials generated in the anode 48 and the cathode 50 of each pair 20 of electrodes by the generating system 22 are of equal amplitudes and opposite signs.

Advantageously, the generating system 22 is suitable for generating, in each anode 48 and each cathode 50, electric potentials determined such that the electric field is of substantially constant amplitude along the central axis A, between the pairs 20 of electrodes, and substantially oriented along the transverse direction Y.

Such an arrangement makes it possible to improve the separation of the granules.

Advantageously, the electric potentials of the anode 48 and the cathode 50 are determined based on the gap separating the anode 48 from the cathode 50, measured along the transverse direction Y, such that the electric field between the anode 48 and the cathode 50 does not exceed the dielectric strength of the air contained in the chamber 14.

This makes it possible to prevent a dangerous electric arc from forming in the chamber 14.

According to one embodiment, the generating device 22 is suitable for generating electric potentials of different amplitudes in each of the anodes 48 and in each of the cathodes 50.

This configuration allows better control of the electric field at the central axis A.

Advantageously, in one such embodiment, the separating device 10 comprises at least one insulating panel 52 placed between two anodes 48 or between two cathodes 50 of two pairs 20 of successive electrodes.

Advantageously, as shown in FIG. 4, the separating device 10 comprises an insulating panel 52 placed between each of the anodes 48 of the pairs 20 of successive electrodes, and between each of the cathodes 50 of the pairs 20 of successive electrodes.

The insulating panels 52 are screens made from an electrically insulating material, for example plastic, inserted between the adjacent anodes 48 and/or between the adjacent cathodes 50.

The insulating panels 52 are suitable for preventing the formation of an electric arc between two anodes 48 or between two cathodes 50 brought to electric potentials of different amplitudes, the difference in potential of which would exceed the dielectric strength of the air contained in the chamber 14.

A method for electrostatic separation of a mixture 12 of granules of different materials, implementing an electrostatic separation device 10 shown in FIGS. 1 and 2 will now be described.

The method comprises a preliminary step for charging of the granules by the charging device 16, in particular by rubbing of the granules against one another and/or against the walls of the charging device 16.

At least one portion of the granules receives a positive surface charge and at least one portion of the granules receives a negative surface charge, based on respective compositions of the granules.

The method also comprises a step for generating a difference in electric potential between the anode 48 and the cathode 50 of each pair 20 of electrodes, via the generating device 22.

The differences in potential generate an electric field between the anodes 48 and the cathodes 50 of each pair 20 of electrodes.

The method next comprises a step for introducing the mixture 12 of granules through the inlet 26 of the separation chamber 14, via the introduction device 28. The granules are introduced and fall through the chamber 14 under the effect of gravity.

The method then comprises a step for separating at least a portion of the granules by deflection of each granule having a positive surface charge toward the anodes 48 and deflection of each granule having a negative surface charge toward the cathodes 50.

The method lastly comprises a step for collecting separated granules in the collection device 18. The granules are received in different compartments 38 based on the experienced deflection, and therefore based on the composition of the granules.

One manner of evaluating the effectiveness of the separation is described hereinafter. Other manners exist and would also show that the separation with the described method is more effective than the separation done with the methods of the state of the art.

A purity of a material A in one of the compartments 38 with index n, denoted $P_A(n)$, is measured on granules taken from the compartment, for example using a measuring method such as infrared spectral analysis, and calculating the weight ratio of granules of material A to the total sampled weight.

A separation criterion can be defined relative to a minimum expected purity level for the material A. The minimum expected purity level is denoted $P_A^{min}$. For example, the minimum expected purity level $P_A^{min}$ is chosen to be strictly greater than 0.95.

Similarly, a minimum expected purity level for the material B is denoted $P_B^{min}$.

The effectiveness of the separation during the separation method is then determined from the pair of separation criteria for each of the two materials A and B of granules to be separated ($P_A^{min}$, $P_B^{min}$).

At the end of the method previously described, the purities $P_A(n)$ and $P_B(n)$ in each of the compartments 38 are calculated. The compartments 38 in which $P_A(n)$ is strictly greater than $P_A^{min}$ or in which $P_B(n)$ is strictly greater than $P_B^{min}$ are then selected and make up the compartments 38 in which the material considered to be separated [sic].

A separation rate $T_{sep}$, which corresponds to the separated quantity of material to the initial quantity to be separated, is then calculated.

The devices 10 and the described method make it possible to greatly increase the separation rate $T_{sep}$, even after a single passage in the separation device 10, owing to a better configuration of the electric field in the chamber 14.

The replacement of a single pair of electrodes by a plurality of separate pairs 20 of electrodes makes it possible to increase the separation power of the device 10 without increasing the height occupied in the chamber 14.

The improvement in the separation power makes it possible to eliminate multiple passages of the material in the separation device 10, which makes the process faster and more efficient, and reduces the energy cost of the separation. This also makes it possible to do away with a device for returning granules toward the inlet, which is necessary to perform multiple passes.

The better control of the distribution of the electric field in the chamber also makes it possible to increase the energy efficiency of the separation method.

What is claimed is:

1. An electrostatic separation device for a mixture of granules of different materials, the device comprising:
    a separation chamber having an inlet and delimiting an inner volume,
    a collection device for granules placed in the inner volume, opposite the inlet in an elevation direction,
    at least two pairs of electrodes successively placed in the elevation direction in the inner volume, between the inlet and the collection device, each pair comprising an anode and a cathode, placed on either side of a central axis extending in the elevation direction,
    at least one generating system, suitable for applying a difference in electric potential between the anode and the cathode of each pair, and
    at least one insulating panel placed between at least one among the anodes and the cathodes of two successive pairs of electrodes.

2. The device according to claim 1, wherein the anode and the cathode of each pair of electrodes are separated by a gap, the gaps increasing from the inlet of the chamber in the elevation direction, each gap being measured in a direction perpendicular to the elevation direction.

3. The device according to claim 1, wherein the anodes of the pairs of electrodes are aligned in a same row, called first row, and the cathodes of the pairs of electrodes are aligned in a same row, called second row, the first row and the second row each forming an angle inclusively between 0° and 45° with the central axis.

4. The device according to claim 1, wherein each anode and each cathode of each of electrodes is cylindrical, the cylindrical shape having a cylinder axis perpendicular to the central axis.

5. The device according to claim 1, wherein the generating system is able to apply differences in potential between the anode and the cathode of each pair generating an electric field between the pairs of electrodes of constant amplitude along the central axis.

6. The device according to claim 1, wherein the generating system is able to apply differences in potential between the anode and the cathode of each pair of electrodes increasing from one pair of electrodes to the next, from the inlet toward the collection device.

7. An electrostatic separation device for a mixture of granules of different materials, the device comprising:
- a separation chamber having an inlet and delimiting an inner volume,
- a collection device for granules placed in the inner volume, opposite the inlet in an elevation direction,
- at least two pairs of electrodes successively placed in the elevation direction in the inner volume, between the inlet and the collection device, each pair comprising an anode and a cathode, placed on either side of a central axis extending in the elevation direction,
- at least one generating system, suitable for applying a difference in electric potential between the anode and the cathode of each pair, and
- insulating panels placed between the anodes and the cathodes of each pair of successive electrodes.

8. The device according to claim 7, wherein the anode and the cathode of each pair of electrodes are separated by a gap, the gaps increasing from the inlet of the chamber in the elevation direction, each gap being measured in a direction perpendicular to the elevation direction.

9. The device according to claim 7, wherein the anodes of the pairs of electrodes are aligned in a same row, called first row, and the cathodes of the pairs of electrodes are aligned in a same row, called second row, the first row and the second row each forming an angle inclusively between 0° and 45° with the central axis.

10. The device according to claim 7, wherein each anode and each cathode of each of electrodes is cylindrical, the cylindrical shape having a cylinder axis perpendicular to the central axis.

11. The device according to claim 7, wherein the generating system is able to apply differences in potential between the anode and the cathode of each pair generating an electric field between the pairs of electrodes of constant amplitude along the central axis.

12. The device according to claim 7, wherein the generating system is able to apply differences in potential between the anode and the cathode of each pair of electrodes increasing from one pair of electrodes to the next, from the inlet toward the collection device.

13. A method for electrostatic separation of a mixture of granules of different materials, the method implementing an electrostatic separation device, the device comprising:
- a separation chamber having an inlet and delimiting an inner volume,
- a collection device for granules placed in the inner volume, opposite the inlet in an elevation direction,
- at least two pairs of electrodes successively placed in the elevation direction in the inner volume, between the inlet and the collection device, each pair comprising an anode and a cathode, placed on either side of a central axis extending in the elevation direction,
- at least one generating system, suitable for applying a difference in electric potential between the anode and the cathode of each pair of electrodes and
- at least one insulating panel placed between at least one among the anodes and the cathodes of two successive pairs of electrodes, the method comprising the following steps:
- introducing the mixture of granules through the inlet of the chamber,
- generating a difference in electric potential between the anode and the cathode of each pair of electrodes,
- separating at least part of the granules, and
- collecting separated granules in the collection device.

14. The method according to claim 13, comprising a prior step for charging at least some of the granules of the mixture by triboelectricity, a portion of the granules being positively charged and a portion of the granules being negatively charged, such that the granules are deflected between the pairs of electrodes toward the anodes if they are positively charged and toward the cathodes if they are negatively charged.

* * * * *